D. E. EDDLEMAN & F. H. McFARLAND.
BALE TIE BUCKLE.
APPLICATION FILED APR. 27, 1911.
1,033,561. Patented July 23, 1912.
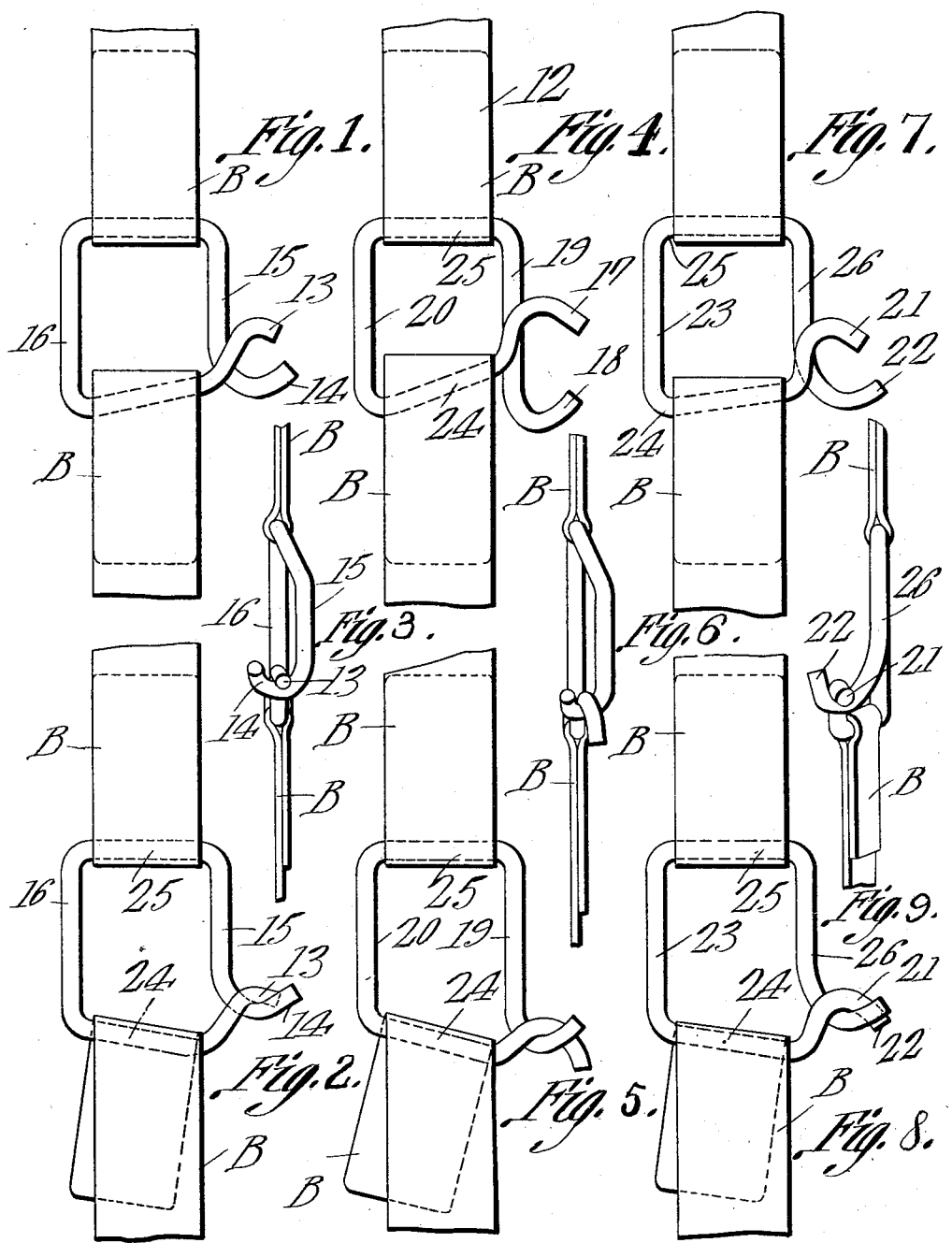

UNITED STATES PATENT OFFICE.

DUDLEY E. EDDLEMAN, OF WEATHERFORD, AND FRANK H. McFARLAND, OF FORT WORTH, TEXAS, ASSIGNORS TO STANDARD BALE WIRE BUCKLE CO., OF FORT WORTH, TEXAS, A CORPORATION OF TEXAS.

BALE-TIE BUCKLE.

1,033,561. Specification of Letters Patent. Patented July 23, 1912.

Application filed April 27, 1911. Serial No. 623,740.

*To all whom it may concern:*

Be it known that we, DUDLEY E. EDDLEMAN and FRANK H. McFARLAND, citizens of the United States, residing, respectively, at Weatherford and Fort Worth, in the counties of Parker and Tarrant, State of Texas, have invented a new and useful Bale-Tie Buckle, of which the following is a specification.

This invention relates to that class of bale ties in which one of the band engaging members is provided with a locking hook to be engaged by the free end of the other member.

The object of the present invention is so to dispose the locking hook relative to the adjacent band engaging member, that when strain is applied to the two members from the draft of the bale band, the member engaging the hook will be deflected and caused to occupy a plane oblique to the other member, with the result that the band is caused to be crowded toward and bear against the hook, thus positively holding the hook and member in locked engagement, and against the possibility of accidental separation.

With the above and other objects in view, as will appear as the nature of the invention is better understood, the same consists in the novel bale tie, hereinafter described and claimed.

In the accompanying drawings forming a part of this specification, and in which like characters of reference indicate corresponding parts, two forms of bale band tie have been illustrated, each embodying the generic idea of the invention, and in these drawings Figure 1 is a side elevation of a form of the invention showing the position of the parts when no strain is on the band. Fig. 2 is a similar view showing the parts in locked engagement. Fig. 3 is an edge view of Fig. 2. Figs. 4, 5, and 6 are views similar to Figs. 1, 2, and 3, of a modified form of the invention. Figs. 7, 8, and 9 are views similar to Figs. 4, 5, and 6 of a still further modified form of the invention.

In the form of the invention shown in Figs. 1, 2, and 3, the beak 13 and hook 14 are relatively short, and the hook carrying member 15, as shown in Fig. 3, is deflected out of the plane of the side member 16, so that ample space will be provided for the engagement of the beak and the hook. It will be noted by reference to Fig. 1 that the member 24 is normally deflected toward the member 25, and when under strain the member 24 is deflected away from the member 25. The object of the first arrangement, that is, of having the member 24 normally deflected toward the member 25, is to overcome the tendency of the band or bale tie to work laterally off of the member 24 before strain comes on the bale tie, and the second arrangement is to cause the bale tie to crowd over toward the hook when strain is applied to the bale tie to cause a positive interlocking relation to be established between the beak and the hook. The curving of the hook from its intermediate portion toward the beak is of great importance, inasmuch as it will provide ample space and insure proper interlocking of the beak and hook, which might not always result if the hook were straight at its intermediate or shank portion, so that trouble might ensue in baling cotton, but by the arrangement shown, the beak always lies within the bend of the terminal of the hook, and thus a positive co-action of the parts will always be assured.

In the form of the invention shown in Figs. 4, 5 and 6, the beak 17 and hook 18 are relatively long, thus to insure the positive interlocking thereof under strains from the band, the hook-carrying member 19 being deflected or disposed in a plane beyond the side member 20 in the same manner as in the form of the invention shown in Figs. 1–3.

In the form of the invention shown in Figs. 7, 8 and 9, the beak 21 is substantially of the same contour as that shown in Fig. 4, while the hook 22 is longer, and extends laterally beyond the terminal of the beak, and beyond the plane of the hook-carrying member 23, this form being also certain of operation to cause the interlocking of the beak and the hook. The hook-carrying member 26 is provided at its lower end with a long curve that terminates in a hook, this curve serving to project the hook a sufficient distance in advance of the side member 23 to insure the positive interlocking of the beak and hook.

In each of the three modifications just described, the feature of having the band engaging member 24 disposed obliquely to the member 25 when the hook and beak are in locked engagement is present, so that the function secured by the structures shown in Figs. 1-4 is secured.

The advantage of having the two interlocking hooks, or the hook and the beak, project laterally from the side of the buckle is that the buckle is easier made, the buckle will not slip through the presser block, the interlocking is easier accomplished, and the friction between the interlocking parts is more extensive and will thus make the buckle hold more securely.

From the foregoing description it will be seen that although the improvements of this invention are simple in character, they will be found thoroughly efficient for the purpose designed and will co-act in the production of a durable, simple and highly efficient form of bale tie buckle.

We claim:

A bale tie buckle embodying a frame comprising band engaging members, one of which is bent at an angle to form a side bar having its terminal formed into a hook projected laterally from the side bar and the other of which is normally deflected at an inward angle relative to the first and projected laterally beyond said side bar and terminates in a beak spaced away from said hook to provide an entrance throat, but lying within the plane of the bill of the hook thus to insure positive co-action between the beak and the hook under strain, the hook being disposed such distance upon the beak that when the member carrying the latter is deflected by strain from the band the beak will be brought into engagement with the hook and the second mentioned band engaging member will occupy a plane oblique to the first mentioned band engaging member.

In testimony that we claim the foregoing as our own, we have hereto affixed our signatures in the presence of two witnesses.

DUDLEY E. EDDLEMAN.
FRANK H. McFARLAND.

Witnesses:
H. L. BREVAUL,
J. W. BRASELTON.